Figures 1, 2:
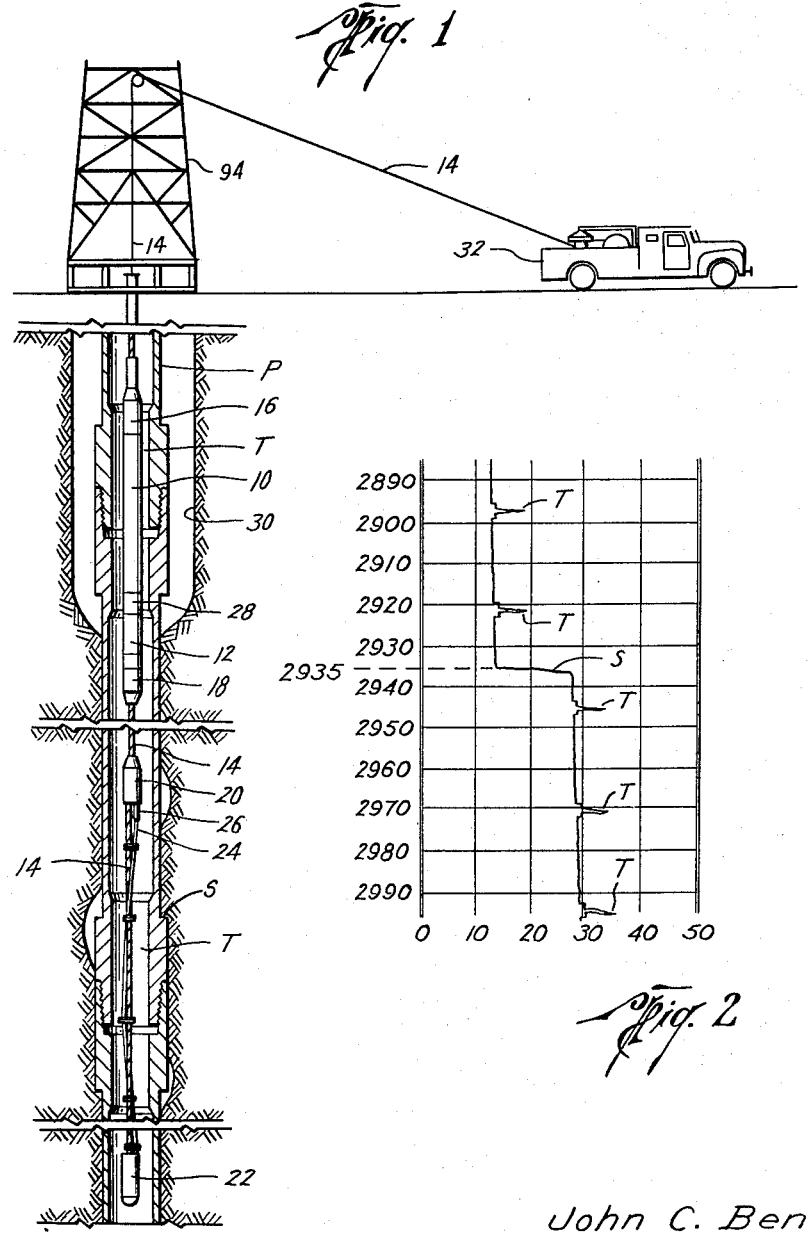

John C. Bender
INVENTOR.

BY James F. Weiler

ATTORNEY

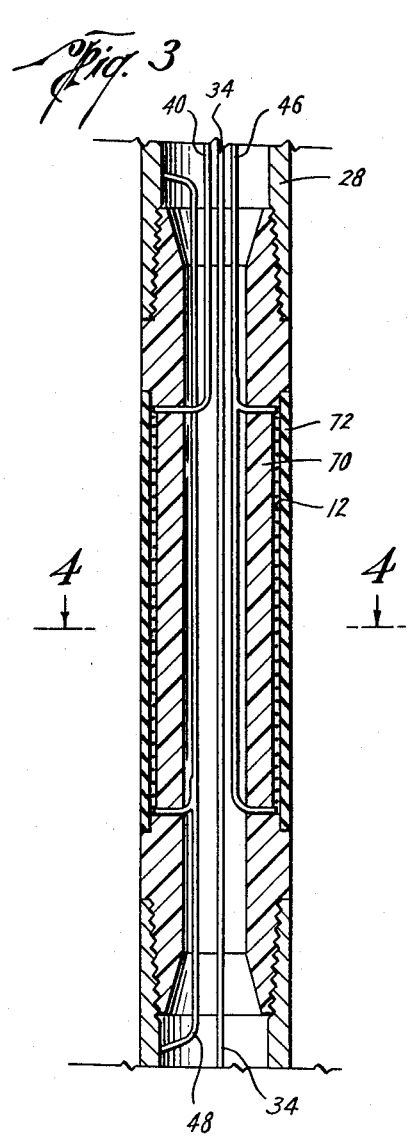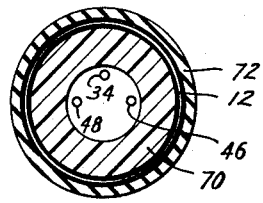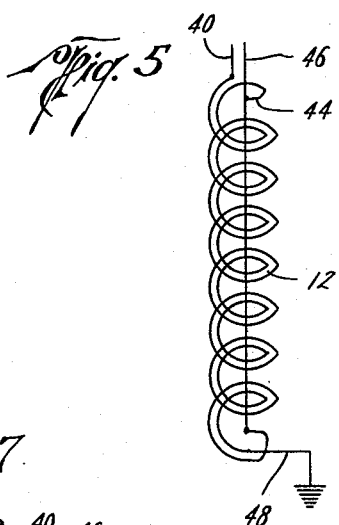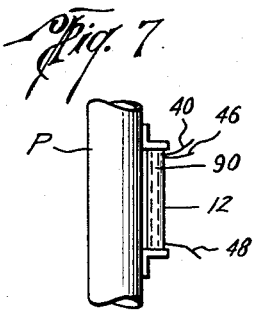
John C. Bender
INVENTOR.

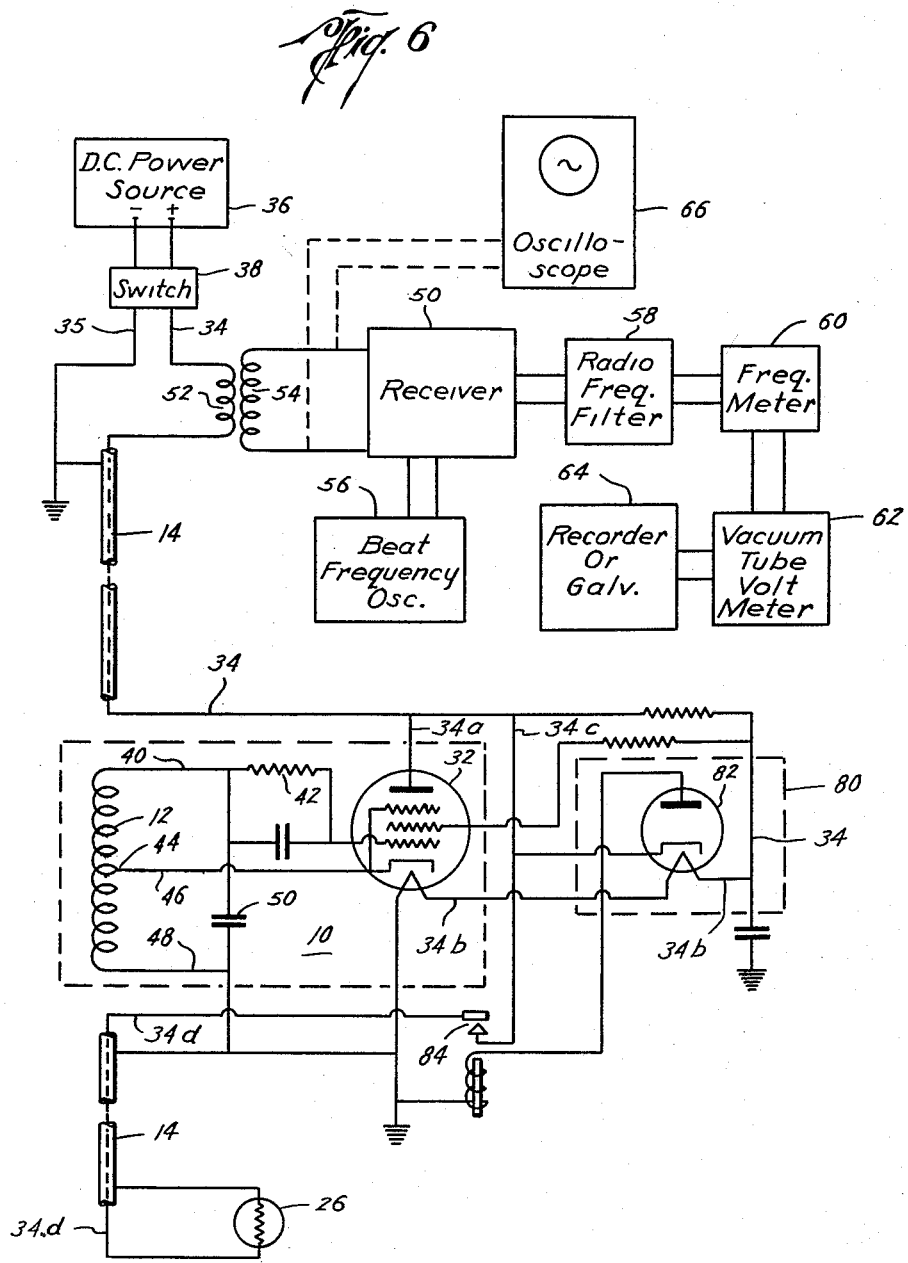

United States Patent Office 2,961,602
Patented Nov. 22, 1960

2,961,602

METHOD OF AND APPARATUS FOR DETERMINING PHYSICAL PROPERTIES OF MATERIALS

John Carlos Bender, Houston, Tex., assignor to Houston Oil Field Material Company, Inc., Houston, Tex., a corporation of Delaware Original application July 3, 1950, Ser. No. 171,919, now Patent No. 2,686,039, dated Aug. 10, 1954. Divided and this application May 12, 1954, Ser. No. 429,310

7 Claims. (Cl. 324—34)

This invention relates to a method of and apparatus for determining physical properties of materials and determining physical properties of pipe in a well bore whereby varying physical conditions thereof may be indicated in a testing circuit thereby determining with accuracy such conditions and the location of forces effecting such conditions. The present application is a division of application Serial No. 171,919, filed July 3, 1950, and now Patent No. 2,686,039.

In the drilling of oil wells it frequently becomes desirable for a number of reasons to locate accurately certain conditions of the pipe and certain conditions in the well bore affecting such pipe positioned therein. For example, where drilling is by the rotary method frequently the drill string or pipe becomes stuck or fixed in the well bore. Several and various causes contribute to this condition, such as caving, sedimentation, heaving and consequent packing of sand or earth formations about the pipe. It is, of course, highly desirable to determine as accurately as possible the exact point at which the pipe or casing is lodged or fixed in the well bore in order that the pipe may be retrieved in a most efficient manner and that a maximum amount of free pipe may be recovered on the first pipe retrieving run.

It is a prime object to provide means for and method of inductively coupling successive portions of the pipe to a testing circuit thereby making such portions part of the testing circuit whereby changes in the reflected load of the pipe will be indicated therein thereby indicating conditions of the pipe.

It is an important and major object of my invention to provide a means for and method of disconnecting and recovering stuck pipe in a well bore wherein complete control over all operations is maintained at all times. For example, it is desirable to determine whether the torque applied to the pipe which completes disconnection of the pipe on impact extends down to the stuck portion; this is an important factor in crooked holes. It is also of prime importance to determine whether the pipe has been freed upon impacting, and it is extremely desirable to determine these and other factors and conditions all in one trip in the well bore.

The present invention is an adaptation of the theory that the reflected load of an element inductively coupled to a testing circuit will vary with changes in the physical condition of the element, such as changes in resistivity, size and permeability, thereby providing an indication of such change in the reflected load in such circuit; and, accordingly, providing an indication as to the condition of or external conditions affecting the element.

It is a still further feature of my invention to provide a strain gage which may be easily secured to such structures, on derricks, bridges and other stressed members.

It is yet a further feature to provide a strain gage which is capable of accurately indicating minute strain or load in the member to which it is attached.

A still further feature of my invention is the provision of a strain gage which may be secured to a specimen and readings made at a remote point, the coil being a portion of a radiating medium.

Still further features and objects will be apparent from the following description of various embodiments of my invention.

The present method and apparatus is particularly, but not necessarily, adapted for determining the location of stuck pipe in a well bore and recovering the same and, accordingly, the following description of one embodiment thereof is directed toward that adaptation.

The accomplishments of the above and other objects will be apparent to those skilled in the art from the following description when taken in connection with the accompanying drawing, wherein like reference characters refer to like parts throughout the several views, and it is to be expressly understood that the drawing is not a definition of the invention, but merely illustrates a preferred form of a device by means of which the principles of the invention may be effectuated and where Fig. 1 is an elevation illustrating the invention in combination with means to disconnect the free pipe, Fig. 2 is a typical graph of a record illustrating a point of fixture of pipe in a well bore, Fig. 3 is an elevation in section illustrating a preferred coil utilized in my tester, Fig. 4 is a cross-section taken along the line 4—4 of Fig. 3, Fig. 5 is a diagrammatic illustration of a preferred bifilar winding of a coil, Fig. 6 is a schematic circuit diagram illustrating a preferred electrical arrangement for the purposes of my invention, and Fig. 7 illustrates an embodiment of my invention utilized to determine load, stress or strain in specimens or objects.

Referring to the drawings my invention includes an oscillator 10 and a coil 12 secured to the cable 14 by means of the upper conventional cable connection 16. The coil 12 is threadedly secured at its lower end to the conventional cable connection 18 from which the cable 14 extends a considerable length being connected to the upper conventional cable connection 20 from which the cable 14 continues, having the nose piece or weight member 22 secured to its lower end. Explosive material, such as prima cord 24, is secured to the lower portion of the device and the former has the detonating cap 26 secured to its upper end. The oscillator 10 and coil 12 are secured together by the coupling 28 which may be any preferred or conventional coupling known to the art to provide an electrical connection between the oscillator and the coil.

The cable 14 contains electrical conductors 34 and 35 and such cable may be any conventional type known to the art. The composite device is lowered into the well bore 30 by means of the cable extending from the conventional reel and measuring equipment disposed on the truck, all generally indicated by the numeral 32, the cable 14 being threaded through the derrick 94. The cable and means for lowering the device into the well are well known to the art and no detailed description thereof is considered necessary.

Referring to Fig. 6 the oscillator illustrated includes a pentode 32, the plate of which is supplied positive potential by means of the electrical conductors 34 and 34a of the cable 14 from a direct current source of power 36. A reversing switch 38 is provided for a reason which will be apparent later. The coil 12 is connected by the conductor 40 through the grid resistor 42 to the grid of the pentode 32 and a center tap 44 of the coil 12 is provided whereby the coil is tapped to the cathode of the pentode by means of the conductor 46. The coil 12 is connected by the conductor 48 to ground and a condenser 50 is provided in parallel with the coil 12. In the arrangement illustrated the electron-coupled oscillator will generate radio frequency current so long as positive potential is supplied to the plate of the pentode 32. While any desired frequency may be utilized, I have found that a frequency between 20 and 50 kilocycles is satisfactory for my purpose. Thus the tank circuit provides a radiation from the coil or probe 12 which inductively couples the casing or pipe P to the tank circuit of the oscillator by the radiated waves and any changes in the inductive load reflected into the tank circuit will be indicated on the oscilloscope 66 or the recorder 64. This circuit is inductively coupled to the radio receiver 50 through the line 14 to the primary 52 and secondary 54. The radio receiver 50 is located on the surface and is of the conventional tuned radio frequency type to which is connected a variable frequency oscillator 56 which is adapted to produce a beat frequency with the incoming signal from the tank circuit of oscillator 10. I have found that a beat frequency of from 100 to 1000 cycles off the zero beat, that is, the frequency of the oscillator in the hole, is satisfactory for my purpose.

The radio frequencies are filtered by the conventional filter 58, the beat frequency being connected to indicating or measuring means, such as the frequency meter 60, the vacuum tube volt meter 62 and the recorder or galvanometer 64. These elements are all conventional, are in widespread use and may be purchased commercially and no description thereof is deemed necessary. If desired, a conventional cathode ray oscilloscope 66 may be utilized in place of the arrangement described, and the conventional oscilloscope includes a beat frequency oscillator, is well known and no detailed description thereof is deemed necessary.

Referring to Figs. 3 to 5 inclusive, the coil 12 is wound about the tubular Bakelite member 70, such Bakelite member being recessed on its outer portion, and a rubber or suitable sheath 72 is secured about the coil 12 to protect the coil from fluid in the bore. The Bakelite member 70 is threadedly secured to the coupling 28 which secures the coil and oscillator together. Fig. 5 illustrates a bifilar method of winding the coil 12 and the coil is in all respects similar to that described in connection with Fig. 6.

Referring again to Fig. 6 I have provided a rectifier 80 of the vacuum tube type in which the cathode of the vacuum tube 82 is connected to the positive source of power by the electrical conductors 34 and 34b. Thus when a positive potential is being supplied to the cathode of the vacuum tube 82 by means of the electrical conductors 34 and 34b, no current will pass through the vacuum tube rectifier and, accordingly, the relay 84 will remain open. Upon reversing the polarity by means of the reversing switch 38 the cathode of the vacuum tube 82 will be supplied negative potential by conductors 34 and 34b and current will be supplied to and will energize the relay 84 thereby closing the same, thereby closing the circuit and supplying potential to the detonator 26 by means of the conductor 34d, and thereby detonating the explosive, here indicated as prima cord 24. Thus, it is not possible to set off or detonate the explosive unless the reversing switch 38 is reversed to energize the relay 84 thereby closing the same and thereby detonating or firing the explosive, herein indicated as prima cord 24.

If it is desired to determine the point of fixation S of stuck pipe in a well bore and to recover the free pipe above the point of fixation S my method and apparatus may be used as follows. The device may be assembled as illustrated in Fig. 1 and lowered by means of the cable 14 threaded through the derrick 94 from the reel on the truck, generally indicated as 32. Torque may be applied to the pipe or casing P, and torque or tension or both may be maintained constantly or preferably applied intermittently. While testing the pipe and in order not to untimely uncouple lengths thereof, the torque is preferably applied in a direction to tighten the threaded connections, but such may be applied in a direction tending to unthread the couplings. Conventional measuring equipment, not shown, is utilized in connection with the reel, and as the coil unit 12 passes down through the pipe and torque, tension or both is maintained or intermittently applied the conventional chart recording mechanism 64 will indicate changes in the reflected load of the pipe inductively coupled to the coil passing therethrough. A typical graph is shown in Fig. 2. The points indicated by the reference letter T represent tool joints through which the coil is passing and the flattened or horizontal projection of the curve indicated by the reference letter S indicates the top of the stuck portion of the pipe P.

The method of operation includes setting up an alternating or oscillating current in the coil unit 12 and as successive portions of the pipe P come into proximate and spaced relationship therewith such successive portions become inductively coupled with and a part of the testing circuit. Inasmuch as a given area of pipe becomes a portion of the oscillatory circuit due to eddy currents being induced into the pipe and reflected back into the tank circuit, the variation of the reflected load of the pipe will produce a change in inductance of the tank circuit thereby changing the fundamental frequency of the oscillator and thereby indicating the stuck portion due to the change in the reflected load of the free pipe immediately above the point of fixation S and the stuck pipe immediately therebelow. Inasmuch as the pipe above the stuck portion is under tensile stress or torque or both it seems manifest that there is a change in the reflected load of the pipe at the point of fixation inasmuch as the pipe at that point and therebelow will not be under such tensile or torque stresses.

After locating the upper portion S of the stuck pipe P, torque may be applied tending to unthread the coupling and the device will give an indication whether such torque extends down to the stuck portion S. If not, the pipe may be worked up and down while applying such torque. When torque has been extended to the top of the stuck portion the device may be raised until the prima cord 24 is preferably centered on the coupling desired to be broken. This is usually one or more joints above the stuck point S. The pipe may then be lifted by conventional means to neutralize the weight of the pipe at the desired coupling. The impacting means, in this case the prima cord 24, is detonated by reversing the polarity of the conductors 34 and 35, thereby energizing and closing the relay 84. This allows current to flow through the detonating cap 26 and initiate the explosive of the impacting means. This explosion sets up shock waves producing a vibratory or hammering effect at the coupling, which combined with the applied torque, will tend to unthread the coupling at this point. If the torque in the string of pipe is insufficient to completely effect the disconnection, the rotary table, not shown, may be rotated and an additional amount of torque applied until the disconnection is complete. If desired the oscillator and coil may be lowered and an indication in the testing circuit will occur if the joint is free. Thus complete control and knowledge of the operations are maintained and available at all times. Thereafter the device and the pipe may be removed in a conventional manner well known to the art. Of course, if desired, the impacting device and oscillator and coil may be run separately, but manifestly many of the above advantages will not be present.

From the above description it is manifest that my method and apparatus is particularly adapted to locate the point of fixation of stuck pipe in a well bore and to free the same. In locating the stuck pipe, however, it is not necessary to put a tensile or torque force on the pipe as the weight of the free pipe above the stuck portion will apply a compressive force or stress in the pipe which will not be present in that portion of the pipe which is tightly lodged against the sides of the well bore. It has been found that a much sharper curve obtains when the permeability is changed due to compressive forces rather than tensile or torque forces. It seems apparent that in locating the position of fixture of stuck pipe in the well bore that either torque or tensile forces or any combination thereof may be utilized. Moreover, while my invention and method has been described particularly with respect to a method of removing pipe from wells in which an explosive charge is discharged substantially proximate the connection to be unthreaded preferably while taking tension and torque or only torque tending to unthread the connection on the pipe, as broadly taught in Kinley, Patent No. 2,305,261, issued December 15, 1942, it is manifest that other means of providing the necessary impact to the desired coupling to be unthreaded may be utilized, such as the hydraulic surge method taught by Mason in Patent No. 2,361,558, issued October 31, 1944, or by using what is known as an "explosion type" bailer such as described in Gates, Patent No. 2,139,076, issued December 6, 1938. It is believed to be preferable, however, to utilize the prima cord method of providing the necessary impact to the connection to be unthreaded as above described.

It is to be understood that any type of conventional L.C. oscillators may be employed and that any type of conventional coil may be utilized to inductively couple the pipe to the testing circuit, and any of the coils illustrated in the patent to H. C. Knerr et al., No. 2,124,579, may be utilized, as well as others known to the art. Moreover, if desired the prima cord may be fired by means of an alternating current. In this instance the switch 38 may be provided with contacts to an A.C. power source and when the switch is manipulated so that A.C. current flows in the conductors 34 and 35, alternating current will be applied to the plate of the tube and due to the reactance of conductor 35, current will be applied to and energize the relay 84. In this instance it is preferable for the relay 84 to have a shaded pole to reduce chattering and thereby provide a good contact on closing. Current then passes through the fuse or detonator 26 to ground and thereby detonates the explosive. In all other respects the circuit may be the same as illustrated and described.

While the above description of my invention has been directed toward a particular use to which it is especially adapted it is to be understood that my invention includes the omission of the impacting device altogether and in such cases and uses my device may be utilized for determining various conditions of pipe in a bore hole or various conditions of materials to which it may be secured. For example, my oscillator and coil may be utilized in finding splits, holes, threads in casing or pipe inasmuch as there will be a change in the reflected load at that point which will be indicated by the testing circuit. Similarly, it is possible to locate accurately the position of gun perforation holes to determine whether or not the perforating has been performed at the desired location. As indicated by Fig. 2, the location of tool joints may be indicated by reason of the change in the reflected load in the testing circuit and the location of the top of a liner, screen or a change in the size of the pipe may be readily indicated. It is also possible to locate the top of a cement plug in casing and, in the event gas is escaping about the pipe in a well bore, such escapement of gas will cause a temperature change in the pipe thereby changing the reflected load of the pipe whereby the position or location of such escaping gas or fluid may be readily indicated by the testing circuit. Morever, various valves, such as gas lift valves, and metal adjacent the pipe, such as whipstocks and the like, may be readily indicated and their location determined by virtue of the change in reflected load in the circuit.

A further example of a particular use to which my invention may be adapted is illustrated in Fig. 7 in which the embodiment is essentially a strain gage. The coil 12 is wound about a suitable core 90 formed of material of the desired permeability, such as iron or steel and the like. The core or bobbin may be welded or bolted or secured in any conventional manner to the structure in which a load or stress-strain measurement is to be made. Such a structure may be derrick 34, a bridge or any structure or specimen P in which stress or strain or load measurements are desirable. It should be noted that it is not necessary to have the strain gage connected to the indicating circuit inasmuch as it is a radiating medium. This is particularly advantageous in use with swinging bridges and the like where it may be desirable to utilize a plurality of strain gages.

The basic concept of this embodiment of my invention is the provision of a permeable bobbin which is secured to the surface of the specimen in such a way that the bobbin experiences the same load, stress or strain as the specimen and, inasmuch as the bobbin is of the desired permeability, minute load, stress or strain in the specimen will be readily indicated in the testing circuit due to the change in permeability of the bobbin 90 thereby varying the reflected load into the tank circuit. Thus the load, stress or strain in the specimen per se is measured by means of the complementary load, strain or stress set up in the permeable bobbin 90 about which the coil 12 is wound. It is manifest that extremely accurate measurements of load and stress-strain in materials may be made by means of my invention. It is to be understood that the indicating circuit available for the measurements of the strain gage may vary widely, and such may operate on the principle of the Wheatstone bridge and galvanometer and the like or a circuit similar to that of Fig. 6 may be used.

In the following claims "anomalies" are defined as permeability change; physical change, such as splits, holes, perforations, threads, valves and metal such as whipstocks associated with the pipe, overshots, tool joints, screens and changes in the size of pipe and the like. It is to be further understood that any conventional oscillating generator and indicating means may be utilized; however, the arrangement illustrated is preferred. It is apparent that my invention is of wide scope and application and I intend to be limited only by the scope of the appended claims.

I claim:

1. A method of determining anomalies in a hollow magnetic member in a well bore comprising, lowering into the well bore a portion of a test circuit including an oscillator provided with an electronic tube and an oscillator coil, said coil being located close to said tube, inducing an electromagnetic field in a cross-sectional portion of the hollow magnetic member by inductively coupling a cross-section portion of the hollow magnetic member to said circuit by moving said oscillator, tube and coil in the pipe, and instrumentally noting changes in the circuit due to said anomalies in the hollow magnetic member.

2. A method of determining changes in permeability of pipe in a well bore comprising, lowering into the well bore a portion of a test circuit including an oscillator provided with an electronic tube and an oscillator coil, inducing an electromagnetic field in the hollow magnetic member by inductively coupling successive small portions of the pipe to the circuit, said coil being disposed closely proximate said tube, and instrumentally noting at the surface changes in the test circuit caused by said changes in permeability of the pipe.

3. A method of locating a stuck point of a hollow magnetic member in a well bore comprising, moving a portion of a test circuit including an oscillator provided with an electronic tube and an oscillator coil in the well bore, inducing an electromagnetic field in the hollow magnetic member by inductively coupling successive small portions of the hollow magnetic member to the circuit, said coil being located proximate said tube, and instrumentally noting at the surface changes in the circuit caused by change in the reflected load of free and stuck portions of the hollow magnetic member whereby the stuck point thereof is indicated.

4. The method of claim 3 including applying force to the hollow magnetic member to cause a change in the reflected load of the free and stuck portions thereof.

5. A method of locating a point of stuck pipe in a well bore comprising, simultaneously lowering a tank circuit and an oscillator into a well bore, said oscillator including an electronic tube and an oscillating coil disposed closely proximate said tube, simultaneously moving said tank circuit and oscillator in the well bore, inducing an electromagnetic field in the hollow magnetic member by inductively coupling successive small portions of the pipe to the tank circuit, producing at the surface a beat frequency with the incoming signal from the tank circuit, instrumentally noting changes in the beat frequency caused by the change in the reflected load of free and stuck portions of the pipe, and applying force to the pipe to cause a change in the reflected load of the free and stuck portions thereof.

6. Detecting apparatus for use in pipe in a well bore comprising, a support adapted to be lowered from the surface into and moved in the well bore, a test circuit extending from the surface and including an oscillator provided with an electronic tube and a bifilar wound test coil mounted on the support for lowering and moving the oscillator, tube and coil in the well bore, said coil adapted to be inductively coupled to the interior of the pipe, and indicating means at the surface associated with the test circuit whereby changes in the reflected load of the pipe are indicated.

7. A method of determining the location of external conditions affecting a pipe in a well bore by applying an external force to the pipe and surveying the magnetic characteristics of the pipe to determine the location of the external conditions, the improvement comprising surveying the magnetic characteristics of the pipe by lowering into the pipe an oscillator including a tank coil, inductively coupling successive portions of the pipe to the tank coil, inducing an electromagnetic field in said successive portions of the pipe by the coil and noting changes in the oscillator circuit due to changes in the reflected load of such pipe caused by the external conditions.

References Cited in the file of this patent

UNITED STATES PATENTS

| | | |
|---|---|---|
| 2,353,211 | Zuschlag | July 11, 1944 |
| 2,358,520 | Landon | Sept. 19, 1944 |
| 2,442,805 | Gilson | June 8, 1948 |
| 2,470,828 | Millington et al. | May 24, 1949 |
| 2,527,170 | Williams | Oct. 24, 1950 |
| 2,558,427 | Fagan | June 26, 1951 |
| 2,814,019 | Bender | Nov. 19, 1957 |